US012757251B2

(12) United States Patent
Bykov et al.

(10) Patent No.: US 12,757,251 B2
(45) Date of Patent: Oct. 6, 2026

(54) LATENCY-BASED CONTENTION

(71) Applicant: Quantefi Corporation, Detroit, MI (US)

(72) Inventors: Denis Bykov, Fremont, CA (US); James Wood, Seaside, CA (US); Huizhao Wang, San Jose, CA (US); Sheetal Pandey, Milpitas, CA (US)

(73) Assignee: Quantefi Corporation, Detroit, MI (US)

( * ) Notice: Subject to any disclaimer, the term of this patent is extended or adjusted under 35 U.S.C. 154(b) by 171 days.

(21) Appl. No.: 18/471,234

(22) Filed: Sep. 20, 2023

(65) Prior Publication Data

US 2024/0098790 A1 Mar. 21, 2024

Related U.S. Application Data

(60) Provisional application No. 63/376,325, filed on Sep. 20, 2022.

(51) Int. Cl.
*H04W 74/0816* (2024.01)

(52) U.S. Cl.
CPC ............................... *H04W 74/0816* (2013.01)

(58) Field of Classification Search
CPC ...................... H04W 74/0816; H04W 74/0808
See application file for complete search history.

(56) References Cited

U.S. PATENT DOCUMENTS 5,592,622 A 1/1997 Isfeld et al.
11,510,241 B2 * 11/2022 Salem ............... H04W 74/0808
11,533,145 B2 * 12/2022 Chmiel ................. H04W 16/14
2002/0154653 A1 10/2002 Benveniste
2009/0141737 A1 * 6/2009 Ho ........................ H04L 12/413 370/447
2017/0339721 A1 * 11/2017 Mukherjee .......... H04W 72/566
2019/0289633 A1 * 9/2019 Fang ................... H04W 74/006
2020/0287838 A1 * 9/2020 Baron ............... H04W 74/0808

(Continued)

FOREIGN PATENT DOCUMENTS

EP 4510760 A1 * 2/2025 ........ H04W 74/0875
WO WO-2023066726 A1 * 4/2023 ........ H04W 74/0808

OTHER PUBLICATIONS

A Decentralized Reservation Scheme for IEEE 802.11 Ad Hoc Networks—2003 (Year: 2003).*

(Continued)

*Primary Examiner* — Nizar N Sivji
(74) *Attorney, Agent, or Firm* — Buchalter; Jason W. Croft

(57) ABSTRACT

A wireless access point for latency-based contention may comprise a processing device and a transceiver. The processing device may be configured to monitor a media idle time using a media idle time counter, wherein the media idle time is measured from a last transition from a clear channel assessment (CCA) busy indication to a CCA idle indication. The processing device may be configured to identify a frame at a contention queue head. The processing device may be configured to determine a back-off counter when the frame arrives at the contention queue head. The processing device may be configured to push the frame for transmission when the back-off counter is less than or equal to the media idle time counter. The transceiver may be configured to transmit the frame.

16 Claims, 9 Drawing Sheets

(56) References Cited

U.S. PATENT DOCUMENTS

| | | | | |
|---|---|---|---|---|
| 2021/0345404 | A1* | 11/2021 | Lu | H04L 1/0069 |
| 2022/0167403 | A1* | 5/2022 | Wilhelmsson | H04W 74/0808 |
| 2022/0295332 | A1 | 9/2022 | Kim et al. | |
| 2024/0276541 | A1* | 8/2024 | Lv | H04W 52/245 |
| 2025/0193933 | A1* | 6/2025 | Ahn | H04W 74/0816 |

OTHER PUBLICATIONS

International Search Report and Written Opinion for PCT Application No. PCT/US2023/074716 mailed on Feb. 21, 2024, 8 pgs.

* cited by examiner

LATENCY-BASED CONTENTION

RELATED APPLICATION

This application claims the benefit of U.S. Provisional Application No. 63/376,325, filed Sep. 20, 2022, the disclosure of which is incorporated herein by reference in its entirety.

The examples discussed in the present disclosure are related to latency-based contention, and in particular, to latency-based contention for wireless access points and stations.

BACKGROUND

Unless otherwise indicated herein, the materials described herein are not prior art to the claims in the present application and are not admitted to be prior art by inclusion in this section.

Wi-Fi® communications may be configured to occur in multiple frequency bands, including the 2.4 GHz, 5 GHz, 6 GHz, and 60 GHz frequency bands. Wi-Fi® communications may be used in various use cases which may include connecting laptops, printers, smartphones, and other devices. Wi-Fi® communications may also be used in vehicular communications.

The subject matter claimed in the present disclosure is not limited to examples that solve any disadvantages or that operate only in environments such as those described above. Rather, this background is only provided to illustrate one example technology area where some examples described in the present disclosure may be practiced.

SUMMARY

A wireless access point for latency-based contention may include a processing device and a transceiver. The processing device may be configured to monitor a media idle time using a media idle time counter, wherein the media idle time may be measured from a last transition from a clear channel assessment (CCA) busy indication to a CCA idle indication. The processing device may be configured to identify a frame at a contention queue head. The processing device may be configured to determine a back-off counter when the frame arrives at the contention queue head. The processing device may be configured to push the frame for transmission when the back-off counter is less than or equal to the media idle time counter. The transceiver may be configured to transmit the frame.

A wireless access point for latency-based contention may include a processing device and a transceiver. The processing device may be configured to identify a first contention slot comprising one or more first contention parameters and one or more first bandwidth, wherein first background contention may be monitored for the first contention slot using a first background contention timer. The processing device may be configured to identify a second contention slot comprising one or more second contention parameters and one or more second bandwidth, wherein second background contention for the second contention slot may be monitored using a second background contention timer. The processing device may be configured to identify a frame at a contention queue head. The processing device may be configured to select a transmission slot from the first contention slot and the second contention slot based on the first background contention timer and the second background contention timer. The transceiver may be configured to transmit the frame using the transmission slot.

A station (STA) for latency-based contention may comprise a processing device and a transceiver. The processing device may be configured to monitor a media idle time using a media idle time counter, wherein the media idle time may be measured from a last transition from a clear channel assessment (CCA) busy indication to a CCA idle indication. The processing device may be configured to identify a frame at a contention queue head. The processing device may be configured to determine a back-off counter when the frame arrives at the contention queue head. The processing device may be configured to push the frame for transmission when the back-off counter is less than or equal to the media idle time counter. The transceiver may be configured to transmit the frame.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
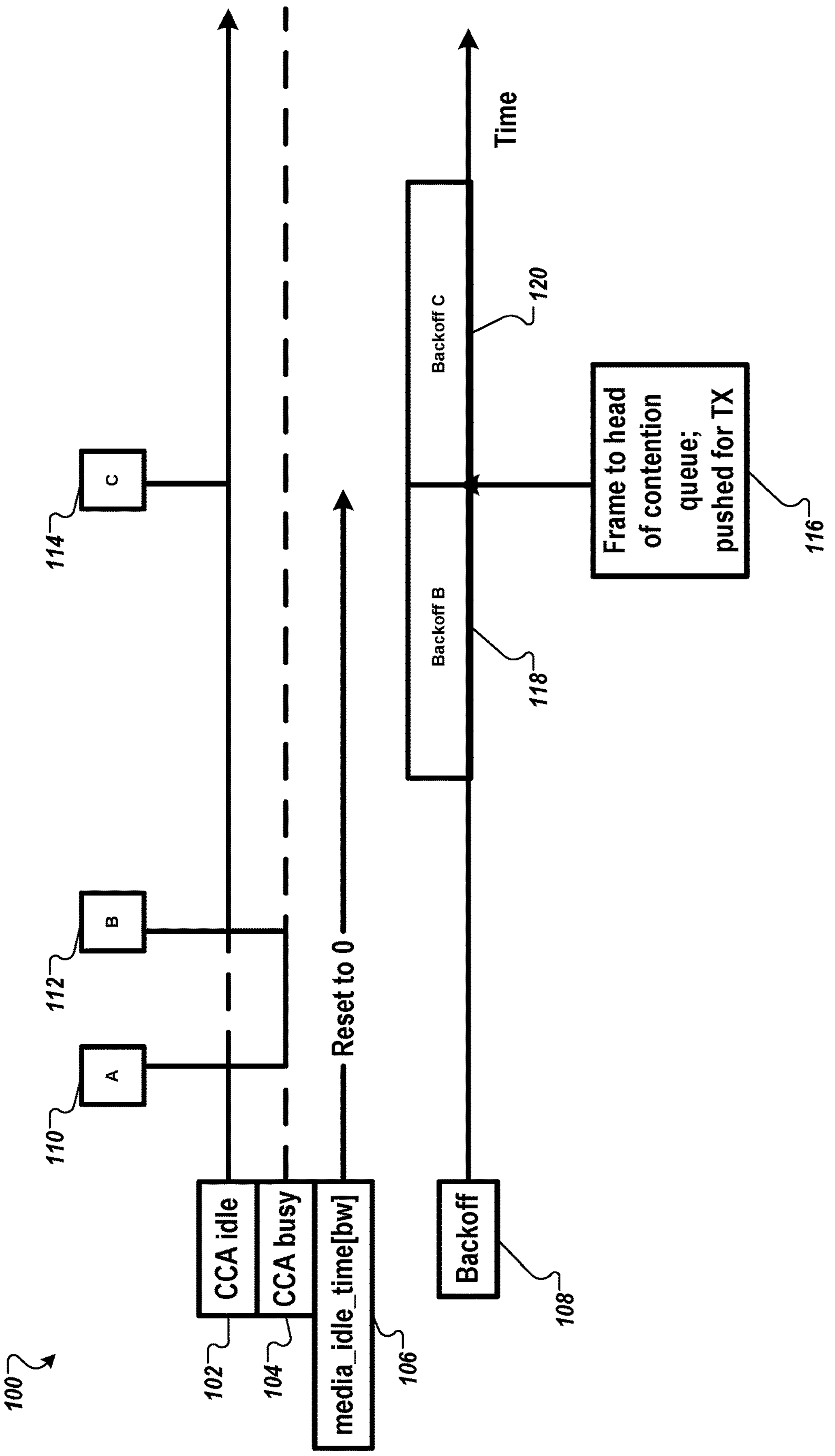
FIG. 1 illustrates an example of idle-based contention described according to at least one implementation of the present disclosure.

Home, office, stadium, and outdoor networks, a.k.a. wireless local area networks (WLAN) may be established using a device (e.g., a Wireless Access Point (WAP)). The WAP may include a router. The WAP may wirelessly couple a plurality of devices in a local network, e.g. wireless stations such as: computers, printers, televisions, digital video (DVD) players, security cameras, and smoke detectors to one another and to the Cable or Subscriber Line through which Internet, video, and television may be delivered to the local network. WAPs may implement the Institute of Electrical and Electronics Engineers (IEEE) 802.11 standard (e.g., IEEE 802.11-2020 and subsequent amendments) which may be a contention-based standard for handling communications among multiple competing devices for a shared wireless communication medium on a selected one of a plurality of communication channels. The frequency range of each communication channel may be specified in the corresponding one of the IEEE 802.11 protocols being implemented, e.g. "a", "b", "g", "n", "ac", "ad", "ax", "ay", "be". Communications may follow a hub and spoke model with a WAP at the hub and the spokes corresponding to the wireless links to each 'client' device or station (STA) using the WLAN.

Wi-Fi® 7/802.11be may include some features to address network traffic that may be sensitive to latency, including video traffic such as augmented reality (AR) and/or virtual reality (VR) traffic. Additionally, a certain amount of flexibility may be provided for a transmit link using Wi-Fi7/802.11be.

In some circumstances, for baseband integrated circuits transmit (BBIC TX) data paths, operations may be configured to occur sequentially in a series of operations. For example, an initial operation may include one or more of: (i) preparing data for transmission (which may be a software-based operation), (ii) pushing the data for transmission (which may be a combination of software and hardware operations), (iii) performing contention to access networking resources (which may be a hardware operation), and (iv) transmitting the data (which may be a hardware operation).

Contention for accessing networking resources may be determined when data is being prepared for transmission (e.g., which may be a software-based operation). In these and other implementations, by monitoring of media idle time, contention time may be reduced and/or a link may be selected for transmission that may have enhanced latency. Such media monitoring and/or earlier contention may occur based on contention procedures and/or standards (e.g., may be compatible with one or more of Federal Communications Commission (FCC) standards, European Union Radio Equipment Directive (EU RED) certification, or the like).

For low latency data (e.g., streaming video, augmented reality frames, virtual reality frames, other high priority data, or the like), low-latency contention may be used to enhance the communication of the low-latency data by monitoring media idle time and/or using a plurality of contention slots.

Monitoring media idle time may enhance the communication of low-latency data. A device (e.g., a WAP or STA) for latency-based contention may include a processing device and a transceiver. The processing device may be configured to monitor a media idle time using a media idle time counter, wherein the media idle time may be measured from a last transition from a clear channel assessment (CCA) busy indication to a CCA idle indication. The processing device may be configured to identify a frame at a contention queue head and determine a back-off counter when the frame arrives at the contention queue head. The processing device may be configured to push the frame for transmission when the back-off counter is less than or equal to the media idle time counter. The transceiver may be configured to transmit the frame.

Using a plurality of contention slots may enhance the communication of low-latency data. A device (e.g., a WAP or STA) for latency-based contention may include a processing device and a transceiver. The processing device may be configured to identify a first contention slot comprising one or more first contention parameters and one or more first bandwidth, wherein first background contention may be monitored for the first contention slot using a first background contention timer. The processing device may be configured to identify a second contention slot comprising one or more second contention parameters and one or more second bandwidth, wherein second background contention for the second contention slot may be monitored using a second background contention timer. The processing device may be configured to identify a frame at a contention queue head and select a transmission slot from the first contention slot and the second contention slot based on the first background contention timer and the second background contention timer. The transceiver may be configured to transmit the frame using the transmission slot.

Embodiments of the present disclosure will be explained with reference to the accompanying drawings.

FIG. 1 illustrates an example timing diagram 100 of latency based contention (e.g., which may be idle-based contention) in accordance with one or more implementations of the present disclosure. A device (e.g., a wireless access point (WAP) or a station (STA)) may be configured for latency-based contention. The device may comprise a processing device and a transceiver. As illustrated in FIG. 1, a processing device may be configured to monitor a media idle time using a media idle time counter (e.g., media_idle_time [bw]). The media idle time may be measured, using the media idle time counter, from a last transition (e.g., point B 112) from a clear channel assessment (CCA) busy indication 104 to a CCA idle indication 102 for a channel. The transition, e.g., at point B 112, from the CCA busy indication 104 to the CCA idle indication 102 may be the last transition (e.g., when there is not a transition from the CCA busy indication 104 to the CCA idle indication 102 that is later in time for the channel).

FIG. 1 illustrates the progression of time from left to right using various timelines (e.g., a CCA idle indication 102 timeline, a CCA busy indication 104 timeline, a media_idle_time[bw] indication 106 timeline, and a back-off indication 108 timeline).

The CCA idle indication 102 timeline and the CCA busy indication 104 timeline may indicate when a CCA is idle or busy for e.g., a particular frequency channel. The media_idle_time[bw] indication 106 timeline may be a media idle time counter that may be for a particular bandwidth (e.g., 20 MHz, 40 MHz, 80 MHz, 160 MHz, 320 MHz, 640 MHz, 1280 MHz, or any other suitable bandwidth used in WLAN communication). The back-off indication 108 timeline may indicate when a back-off is active or inactive. The media idle time (e.g., media_idle_time[bw]) may be monitored based on one or more of a link, a frequency range, a bandwidth, a frequency band, a frequency sub-band, a frequency channel, a contiguous CCA frequency portion, or the like.

The CCA idle indication 102 and the CCA busy indication 104 may be set to be active and/or inactive. When the CCA idle indication 102 is set to be active, then the CCA idle indication 102 may indicate that a channel associated with the CCA idle indication 102 is idle (or the CCA busy indication 104 may indicate that the channel associated with the CCA busy indication 104 is not busy). When the CCA idle indication 102 is set to be inactive, then the CCA idle indication 102 may indicate that a channel associated with the CCA idle indication 102 is not idle (or the CCA busy indication 104 may indicate that the channel associated with the CCA busy indication 104 is busy).

For example, before point A 110 on the timeline for the CCA idle indication 102, the CCA idle indication 102 may be active, which may indicate that the channel associated with the CCA idle indication 102 is not busy. As illustrated, at point A 110, the CCA may transition from idle to busy (for example, to transmit data). Between point A 110 and point B 112 on the timeline for the CCA idle indication 102, the CCA idle indication 102 may be inactive (as shown by the dashed timeline), which may indicate that the channel associated with the CCA idle indication 102 is busy. At point B 112, the CCA may transition back to idle and remain idle. After point B 112 on the timeline for the CCA idle indication 102, the CCA idle indication 102 may be active, which may indicate that the channel associated with the CCA idle indication 102 is not busy.

Alternatively or in addition, before point A 110 on the timeline for the CCA busy indication 104, the CCA busy indication 104 may be inactive (as shown by the dashed line), which may indicate that the channel associated with the CCA busy indication 104 is not busy. Between point A 110 and point B 112 on the timeline for the CCA busy indication 104, the CCA busy indication 104 may be active (as shown by the solid line), which may indicate that the channel associated with the CCA busy indication 104 is busy. After point B 112 on the timeline for the CCA busy indication 104, the CCA busy indication 104 may be inactive, which may indicate that the channel associated with the CCA busy indication 104 is not busy.

A media idle time counter (e.g., media_idle_time[bw] indication 106) may be used. A WLAN media access controller (WMAC) may track a value of the media idle time counter (e.g., media_idle_time[bw]) since the last transition from CCA busy to CCA idle. The media idle time counter may be set to 0 when the CCA idle indication 102 transitions to a CCA busy indication 104. The media idle time counter may be frozen at 0 until the CCA busy indication 104 transitions to the CCA idle indication 102.

In the example in FIG. 1, the media_idle_time[bw] may be reset to 0 at point A 110 when the CCA idle indication 102 is inactive and the CCA busy indication 104 is active. The media_idle_time[bw] may be frozen at 0 between point A 110 and point B 112 during the time when the CCA idle indication 102 is inactive and the CCA busy indication 104 is active. After point B 112, when the CCA idle indication 102 is active and the CCA busy indication 104 is inactive, the media_idle_time[bw] may being to count upwards from 0 to track the value of the media idle time since the last transition from CCA busy to CCA idle.

When a frame arrives to the head of a contention queue, the WMAC may determine a back-off counter (e.g., which may be provided by the back-off indication 108). The processing device may be configured to identify a frame at a contention queue head. The contention queue may be e.g., any suitable contention data structure that may facilitate an order for one or more frames. The processing device may be configured to determine a back-off counter when the frame arrives at the contention queue head. The back-off counter may be tracked using a back-off indication 108. The back-off indication 108 may be configured to count down to 0 from the back-off limit (e.g., the total amount of time to be used for the back-off) to provide a back-off counter (which may be computed as the value obtained from counting down from the back-off limit using the back-off indication 108). When the back-off counter is less than or equal to the media idle time counter (e.g., media_idle_time[bw]), the frame may be pushed for transmission (e.g., using the WMAC). The transceiver may be configured to transmit the frame.

The back-off counter may be determined based on one or more of arbitration inter-frame spacing (AIFS) or a random back-off counter between zero and a contention window (CW). Using the AIFS to determine the back-off counter may facilitate a priority ordering for the back-off counter. For example, for a low-latency media type that may use a quick response time, the back-off counter may be computed to be lower to facilitate transmission of the low-latency media type at a faster rate when compared to a high-latency media type. For a high-latency media type that may allow a slower response time, the back-off counter may be computed to be higher to facilitate transmission of the high-latency media type at the allowed slower rate when compared to the low-latency media type.

At point C 114, a frame (e.g., a data frame) may be pushed for transmission as shown in operation 116. The processing device may be configured to observe the value of the media idle time counter (e.g., media_idle_time[bw]) to verify that the media idle time counter (e.g., media_idle_time[bw]) is greater than a back-off counter (e.g., which may be provided by the back-off indication 108). When the media idle time counter (e.g., media_idle_time[bw]) is greater than the back-off counter, the frame (e.g., a data frame) for transmission may be transmitted. That is, a back-off counter may be used to prevent transmission of a frame (e.g., a data frame) until the back-off counter is less than the media idle time counter.

Alternatively or in addition, by monitoring how long the channel has been idle (e.g., by using a media idle time counter such as media_idle_time[bw]), the comparison between the media idle time counter and the back-off counter (e.g., which may be provided by the back-off indication 108) may be computed when the frame arrives at the head of the contention queue. When the frame (e.g., a data frame) arrives at the head of the contention queue and is pushed for transmission without delay (or before an observed back-off counter has fully elapsed), the back-off counter may be determined retroactively by comparing the media idle time counter to the back-off counter without delay (or before the observed back-off limit has fully elapsed). That is, the frame (e.g., a data frame) may be pushed for transmission at point C 114 after the back-off B 118 instead of waiting for back-off C 120.

In the example shown in FIG. 1, the back-off counter was not measured from the time observed since the frame arrived at the head of the contention queue (e.g., from point C to the end of back-off C 120) but was measured from point C 114 going backward in time to point B 112). The value for the media idle time counter (media_idle_time[bw])—which may occur before the frame (e.g., data frame) arrives at the head of the contention queue—may be compared to the back-off counter (e.g., which may be provided by the back-off indication 108). Comparing the back-off counter (e.g., which may be provided by the back-off indication 108) to the media idle time counter when the frame (e.g., the data frame) arrives at the head of the contention queue may allow the frame (e.g., the data frame) to be pushed for transmission without delay (or before a back-off limit has elapsed when measured relative to the arrival of the frame at the head of the contention queue).

Figure 2:
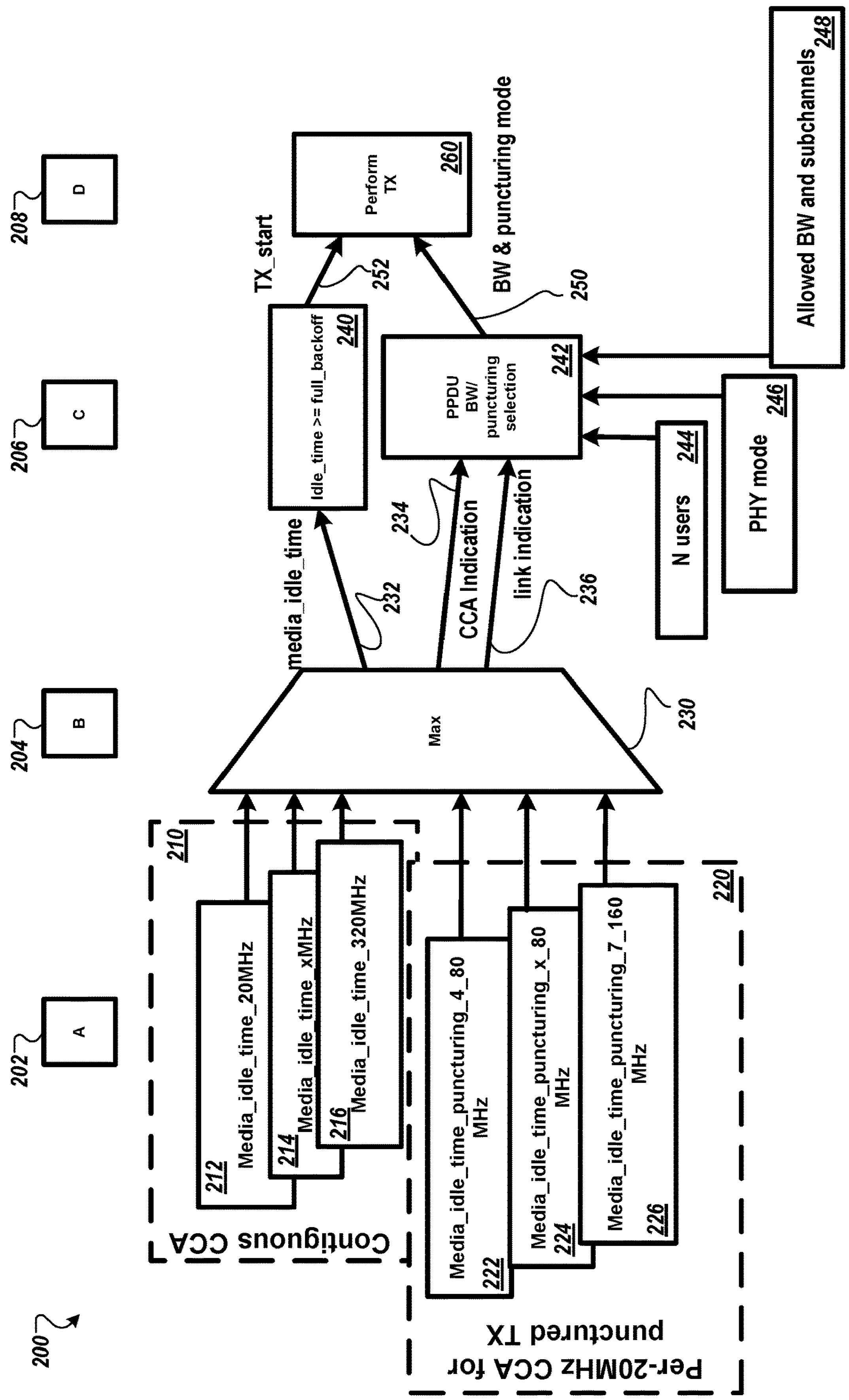
FIG. 2 illustrates an example of idle-based contention, in accordance with multiple transmit links and/or bands, and/or with bandwidth selection, described according to at least one implementation of the present disclosure.

FIG. 2 illustrates an example of latency-based contention 200 (e.g., idle-based contention) in accordance with: (i) various transmit links, and/or (ii) various bands and/or sub-bands and/or channels and/or sub-channels, and/or (iii) various bandwidth selection, and/or (iv) various contiguous CCA, (v) various punctured TX, (vi) various numbers of users, (vii) various physical layer modes, (viii), and/or the like.

A processing device (e.g., a WMAC) may monitor idle time based on one or more of: per link, per band, per sub-band, per channel, per sub-channel, per bandwidth selection, per contiguous CCA, per frequency range, per punctured TX, per numbers of users, per physical mode, or the like. The processing device (e.g., the WMAC) may monitor the media idle time based on puncturing for a dynamic sub-band CCA indication. As illustrated at point A 202, the processing device (e.g., the WMAC) may monitor the media idle time (e.g., media idle time) for various portions of contiguous CCA 210 (e.g., media_idle_time_20 MHz 212; media_idle_time_x_MHz 214; media_idle_time_320 MHz 216) or for various portions of CCA for punctured transmission (Tx) such as per-20 MHz CCA for punctured Tx 220 (e.g., media_idle_time_puncturing_4_80 MHz 222; media_idle_time_puncturing_x_80 MHz 224; media_idle_time_puncturing_7_160 MHz 226).

The processing device (e.g., the WMAC) may be configured to select a transmission mode from a plurality of transmission modes based on one or more transmission mode idle times for the plurality of transmission modes. At point B 204, one or more of the per link, per band, per sub-band, per channel, per sub-channel, per bandwidth selection, per contiguous CCA, per frequency range, or per punctured TX monitoring of media idle time (e.g., media_idle_time) may be provided to the processing device (e.g., the WMAC) which may monitor a selected idle time (e.g., a longest idle time) and may select between various modes based on which idle time is the longest (e.g., using max 230 which may be implemented using a comparator). For example, when a provided punctured bandwidth (BW) has the longest available idle time when selected from among the various modes, or when a provided band of contiguous channel has a longest idle time when selected from among the various modes, the processing device (e.g., max 230) may identify that particular mode as a next transmission mode. Alternatively or in addition, the processing device (e.g., the WMAC) may change the modality to a most ready mode to reduce contention time.

The processing device (e.g., the WMAC) may be configured to select a physical layer protocol data unit (PPDU) BW mode based on one or more of a CCA indication, a link indication, a number of users, a physical layer (PHY) mode, permitted BW channels, or permitted BW sub-channels. Alternatively or in addition, the processing device (e.g., the WMAC) may be configured to select a puncturing mode based on one or more of the CCA indication, the link indication, the number of users, the PHY mode, the permitted BW channels, the permitted BW sub-channels, or the like.

At point C 206, various contentions may be performed depending on the type of modality selected. For example, when the media idle time (e.g., media_idle_time 232 which may be for a selected mode) is greater than or equal to a back-off counter (e.g., a full_backoff), which may be computed in operation 240, the transmission start 252 operation may indicate that the perform Tx 260 operation may be facilitated without delay. Alternatively or in addition, the CCA indication 234 and/or the link indication 236 may be used in a PPDU BW mode and/or a puncturing mode selection 242. The PPDU BW mode and/or puncturing mode selection may be determined using one or more of a number of users (e.g., N users 244), a PHY mode 246, or allowed band, sub-band, channel, sub-channel, bandwidth or the like (e.g., allowed BW and sub-channels 248) that may be monitored and/or considered by the WMAC. Based on one or more of the duration of idle time, on which BW and/or puncturing may be available, and/or which BW and/or puncturing has been idle the longest, the provided BW and/or puncturing mode 250 may be selected and/or provided to the perform Tx 260 operation to be used for transmission.

At point D 208, the transmission (e.g., perform Tx 260 operation) occurs via one or more of the selected link, selected band, selected sub-band, selected channel, selected sub-channel, selected bandwidth selection, selected contiguous CCA, selected frequency range, selected punctured TX, selected numbers of users, selected physical mode, or the like.

Alternatively or in addition, the processing device (e.g., the WMAC) may use per-bandwidth markers in digital media adaptor (DMA) chains which may be used for ready to send (RTS) bandwidth signaling. For example, rather than using the RTS fields of the DMA chains, the media idle time (e.g., media_idle_time) may be monitored and communicated to the processing device (e.g., the WMAC).

Figure 3:
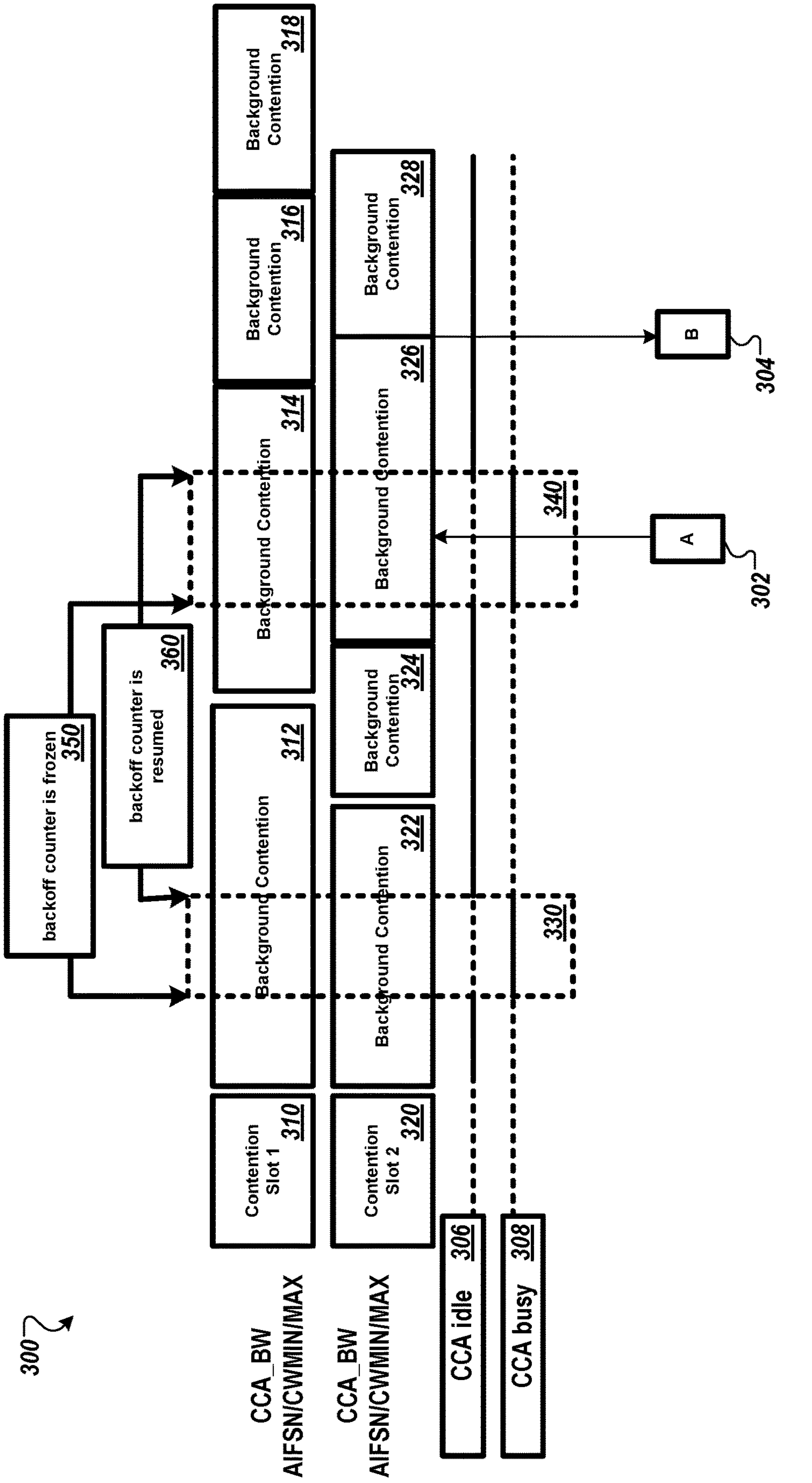
FIG. 3 illustrates an example of continuous background contention described according to at least one implementation of the present disclosure.

Alternatively or in addition, the processing device (e.g., the WMAC) may be configured to select a transmission slot from a plurality of contention slots based on background contention for the plurality of contention slots and push the frame for transmission using the transmission slot, as described in FIG. 3.

FIG. 3 illustrates an example of continuous background contention 300. A processing device may be configured to identify a first contention slot (e.g., contention slot 1 310) which may comprise one or more first contention parameters and one or more first bandwidth. The first background contention (e.g., background contention 312, background contention 314, background contention 316, background contention 318) may be monitored for the first contention slot (e.g., contention slot 1 310) using a first background contention timer.

The processing device may be configured to identify a second contention slot (e.g., contention slot 2 320) which may comprise one or more second contention parameters and one or more second bandwidth. The second background contention (e.g., background contention 322, background contention 324, background contention 326, background contention 328) for the second contention slot (e.g., contention slot 2 320) may be monitored using a second background contention timer. The processing device may be configured to identify a frame at a contention queue head. The processing device may be configured to select a transmission slot from the first contention slot (e.g., contention slot 1 320) and the second contention slot (e.g., contention slot 2 320) based on the first background contention timer and the second background contention timer. A transceiver may be configured to transmit the frame using the transmission slot (e.g., the selected transmission slot from contention slot 1 320 or contention slot 2 320).

One or more of the first contention parameters or the second contention parameters may comprise one or more of: (i) a CCA indication for a bandwidth, (ii) an arbitration inter-frame spacing (AIFS) number, (iii) a minimum contention window (CWMIN), (iv) a maximum contention window (CWMAX), or the like. A slot (e.g., contention slot 1 310, contention slot 2 320, or the like) may correspond to a given portion of bandwidth, and the background contention may be based on the one or more contention parameters. Alternatively or in addition, the one or more slots (e.g., contention slot 1 310, contention slot 2 320, or the like) may operate on the same portion of bandwidth but may have distinct contention parameters used in the background contention (e.g., which may vary the duration of the back-off limit).

For example, the processing device (which may be the WMAC) may be configured to perform contention in the background for one or more slots (e.g., contention slot 1 310 or contention slot 2 320). In FIG. 3, as time progresses from left to right, the CCA may transition between CCA idle 306 and CCA busy 308, as indicated by the solid lines and the dashed lines, while background contention may be performed for the plurality of slots (e.g., contention slot 1 310 or contention slot 2 320). When a frame arrives to the head of the contention queue, the processing device (e.g., the WMAC) may attach the frame to the background contention for a given slot. For example, at point A 302, the frame may be pushed to the background contention 326 for contention slot 2 320. In a worst case scenario, the contention time may be the same as the contention time provided by a procedure that does not use a plurality of contention slots. In an average case scenario, the contention time may be shorter in duration compared to the contention time provided by a procedure that does not use a plurality of contention slots.

When the CCA transitions from idle to busy (e.g., from CCA idle 306 to CCA busy 308 as indicated by the transition from a solid line for CCA idle 306 to a dashed line for CCA idle 306 and the transition from a dashed line for CCA busy 308 to a solid line for CCA busy 308 in the CCA busy region 330), the back-off counter may be frozen, as shown in operation 350, at the beginning of the CCA busy region 330. Alternatively, or in addition, when the CCA transitions from CCA busy 308 back to CCA idle 306, at the end of the CCA busy region 330, the back-off counter may be resumed, as shown by operation 360. When the background contention timer reaches zero, the medium may be used for transmission.

For example, at point A 302, a frame may be pushed for transmission, and contention slot 2 320 may be configured to facilitate transmission of the frame. The frame may be pushed to the background contention 326 for contention slot 2 320 during a CCA busy region 340. The back-off counter may be frozen at the beginning of the CCA busy region 340 and the back-off counter may be resumed at the end of the CCA busy region 340. The background contention 326 for contention slot 2 320 may be completed at point B 304 (e.g., the background contention timer for background contention 326 may expire at point B 304). The attached slot (e.g., contention slot 2 320) may win the contention over the other contention slots (e.g., contention slot 310) and transmission for the frame may begin.

While FIG. 3 is illustrated with two slots (e.g., contention slot 1 310 and contention slot 2 320), any suitable number of contention slots may be used. A processing device (e.g., the WMAC) may be configured to identify an nth contention slot comprising one or more nth contention parameters and one or more nth bandwidth, wherein nth background contention for the nth contention slot may be monitored using an nth background contention timer. The processing device (e.g., the WMAC) may be configured to select a transmission slot from n contention slots based on n background contention timers. The number of contention slots may be n (e.g., which may be any integer greater than or equal to 1 that may be implemented using the processing device such as the WMAC).

Figure 4:
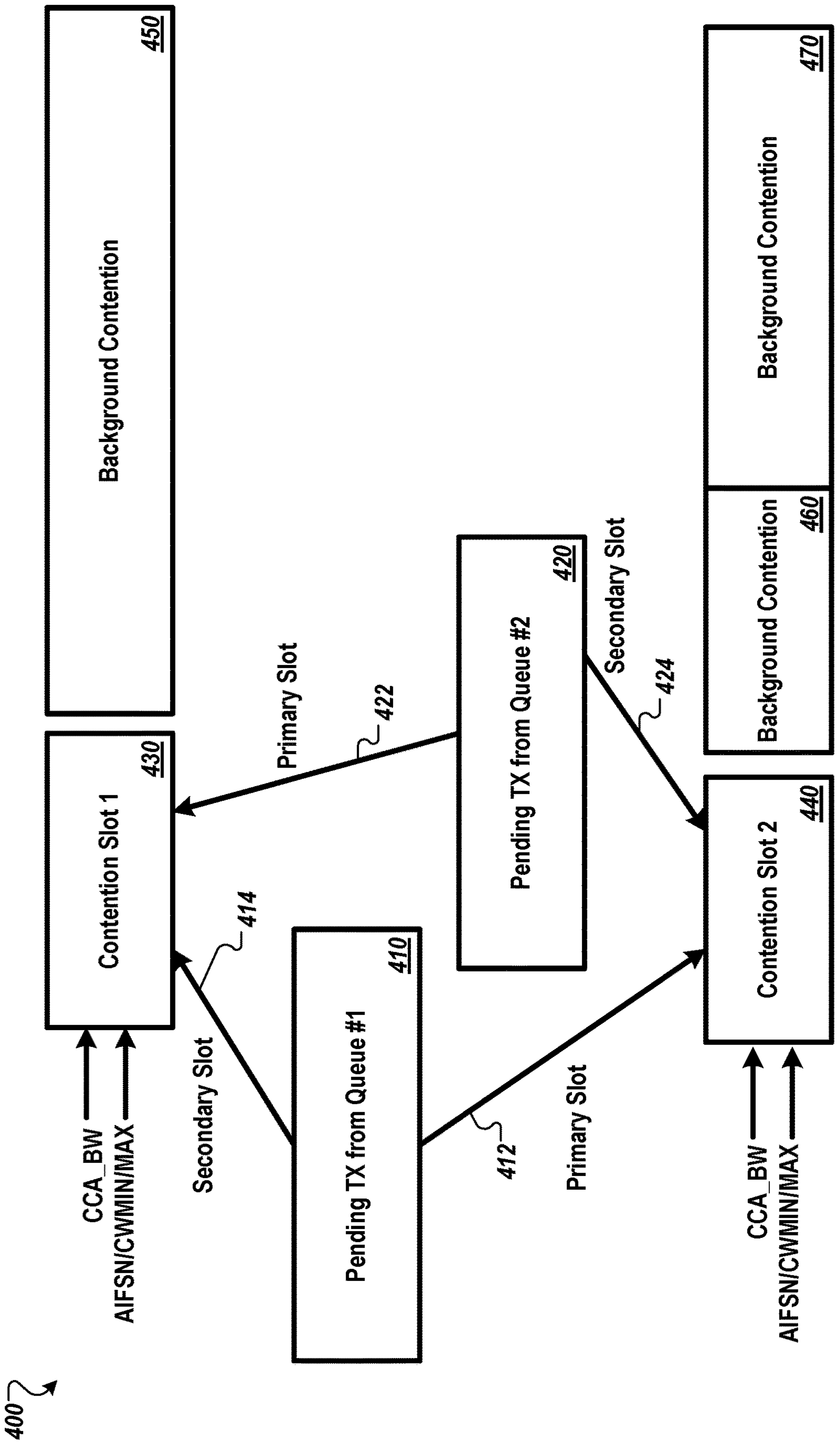
FIG. 4 illustrates another example of background contention described according to at least one implementation of the present disclosure.

FIG. 4 illustrates an example block diagram 400 of background contention in which a transmission frame may be assigned to more than one contention slot (e.g., as a primary slot, a secondary slot, or the like).

A processing device (e.g., the WMAC) may be configured to select the transmission slot based on a first priority level (e.g., selected from primary slot 412, secondary slot 414, or the like) for the first contention slot (e.g., selected from contention slot 1 430 or contention slot 2 440) and a second priority level (e.g., selected from primary slot 422, secondary slot 424, or the like) for the second contention slot (e.g., selected from contention slot 1 430 or contention slot 2 440). One or more of the first priority level, the second priority level, or the like may be based on one or more of: a queue priority level, a frame priority level, a data priority level, or the like. Selecting a transmission slot based on one or more priority levels for one or more contention slots may be used for high priority data (e.g., data having a low latency) such as streaming video, augmented reality frames, virtual reality frames, other high priority data, or the like. The contention slots may be configured based on one or more contention parameters which may include one or more of: a CCA indication for a bandwidth, an AIFS number, a CWMIN, a CWMAX, or the like. The contention slots may be subject to background contention (e.g., contention slot 1 430 may be subject to background contention 450, and contention slot 2 440 may be subject to background contention 460, 470).

When one or more of the first priority level or the second priority level is based on a queue priority level, a pending transmission from a first queue (e.g., a pending TX from queue #1 410) may use: (i) a second contention slot (e.g., contention slot 2 440) as a primary slot 412 for data transmission, and (ii) a first contention slot (e.g., contention slot 1 430) as a secondary slot 414 for data transmission. Alternatively or in addition, a pending transmission from a second queue (e.g., pending TX from queue #2 420) may use: (i) the first contention slot (e.g., contention slot 1 430) as a primary slot 422 for data transmission, and (ii) the second contention slot (e.g., contention slot 2 440) as a secondary slot 424 for data transmission.

Alternatively or in addition, the first priority level, the second priority level, or the like may be based on a frame priority level. For example, a first frame may be associated with a first contention slot as a primary slot for data transmission and a second contention slot as a secondary slot for data transmission. A second frame may be associated with a second contention a slot as a primary slot for data transmission and a first contention slot as a secondary slot for data transmission.

Alternatively or in addition, the first priority level, the second priority level, or the like may be based on a data priority level. For example, first data may be associated with a first contention slot as a primary slot for data transmission and a second contention slot as a secondary slot for data transmission. Second data may be associated with a second contention a slot as a primary slot for data transmission and a first contention slot as a secondary slot for data transmission.

A secondary slot may be used for transmission in various circumstances (e.g., such as when the secondary slot does not have other transmission frames attached to the slot as a primary transmission slot). By providing the use of additional slots (e.g., secondary, tertiary, quaternary, or so forth), with each additional slot having selected contention parameters, the prioritization and/or transmission of the data may be customized in a more robust way when compared to transmission that does not use additional slots. For example, lower priority data (e.g., data that may not use a low latency but may use a high latency) may be transmitted in a secondary slot (e.g., a secondary channel) if there is not higher priority data to transmit (e.g., when the data does not comprise one or more of streaming video, augmented reality frames, virtual reality frames, other high priority data, or the like). When higher priority data and lower priority data are both pushed for transmission and the same contention slot is used for both the higher priority data and the lower priority data, then the secondary slot (e.g., secondary channel) may not be used for transmission of the lower priority data until the higher priority data has been transmitted in the secondary slot (e.g., the secondary channel).

The frame may be pushed for transmission in a WAP. Alternatively or in addition, the frame may be pushed for transmission in a STA. A STA may be configured for latency-based contention. The STA may comprise a processing device configured to monitor a media idle time using a media idle time counter. The media idle time may be measured from a last transition from a CCA busy indication to a CCA idle indication. The processing device may be configured to one or more of: identify a frame at a contention queue head; determine a back-off counter when the frame arrives at the contention queue head; or push the frame for transmission when the back-off counter is less than or equal to the media idle time counter. The STA may comprise a transceiver configured to transmit the frame.

The STA may be configured to have functionality that may be similar to the functionality provided for the WAP. The processing device, at the STA, may be configured to determine the back-off counter based on one or more of AIFS or a random back-off counter between zero and a CW. The processing device, at the STA, may be configured to set the media idle time counter to zero when the CCA idle indication transitions to a CCA busy indication; and/or freeze the media idle time counter at zero until the CCA busy indication transitions to the CCA idle indication. The processing device, at the STA, may be configured to monitor the media idle time based on one or more of a link, a frequency range, a bandwidth, a frequency band, a frequency sub-band, a frequency channel, or a contiguous CCA frequency portion. The processing device, at the STA, may be configured to monitor the media idle time based on puncturing for a dynamic sub-band CCA indication.

The processing device, at the STA, may be configured to select a transmission mode from a plurality of transmission modes based on one or more transmission mode idle times for the plurality of transmission modes. The processing device, at the STA, may be configured to select a PPDU BW mode based on one or more of a CCA indication, a link indication, a number of users, a PHY mode, permitted BW channels, or permitted BW sub-channels, or select a puncturing mode based on one or more of the CCA indication, a link indication, a number of users, a PHY mode, permitted BW channels, or permitted BW sub-channels.

The STA may be configured to have functionality in a plurality of contention slots. The processing device, at the STA, may be configured to select a transmission slot from a plurality of contention slots based on background contention for the plurality of contention slots, and push the frame for transmission using the transmission slot.

The STA may be configured (e.g., using a processing device such as a WMAC) to identify a first contention slot comprising one or more first contention parameters and one or more first bandwidth, wherein first background contention may be monitored for the first contention slot using a first background contention timer. The STA may be configured (e.g., using a processing device such as a WMAC) to identify a second contention slot comprising one or more second contention parameters and one or more second bandwidth, wherein second background contention for the second contention slot may be monitored using a second background contention timer. The STA may be configured (e.g., using a processing device such as a WMAC) to identify a frame at a contention queue head. The STA may be configured (e.g., using a processing device such as a WMAC) to select a transmission slot from the first contention slot and the second contention slot based on the first background contention timer and the second background contention timer. The transceiver, at the STA, may be configured to transmit the frame using the transmission slot.

For the STA, the one or more first contention parameters or the second contention parameters may comprise one or more of: a CCA indication for a bandwidth, an AIFS number, a CWMIN, a CWMAX, or the like.

The STA may be configured (e.g., using a processing device such as a WMAC) to identify an nth contention slot comprising one or more nth contention parameters and one or more nth bandwidth, wherein nth background contention for the nth contention slot may be monitored using an nth background contention timer. The STA may be configured (e.g., using a processing device such as a WMAC) to and select a transmission slot from n contention slots based on n background contention timers, wherein n may be a number of contention slots.

The STA may be configured (e.g., using a processing device such as a WMAC) to select the transmission slot based on a first priority level for the first contention slot and a second priority level for the second contention slot. One or more of the first priority level or the second priority level may be based on one or more of: a queue priority level, a frame priority level, or a data priority level.

Figure 5:
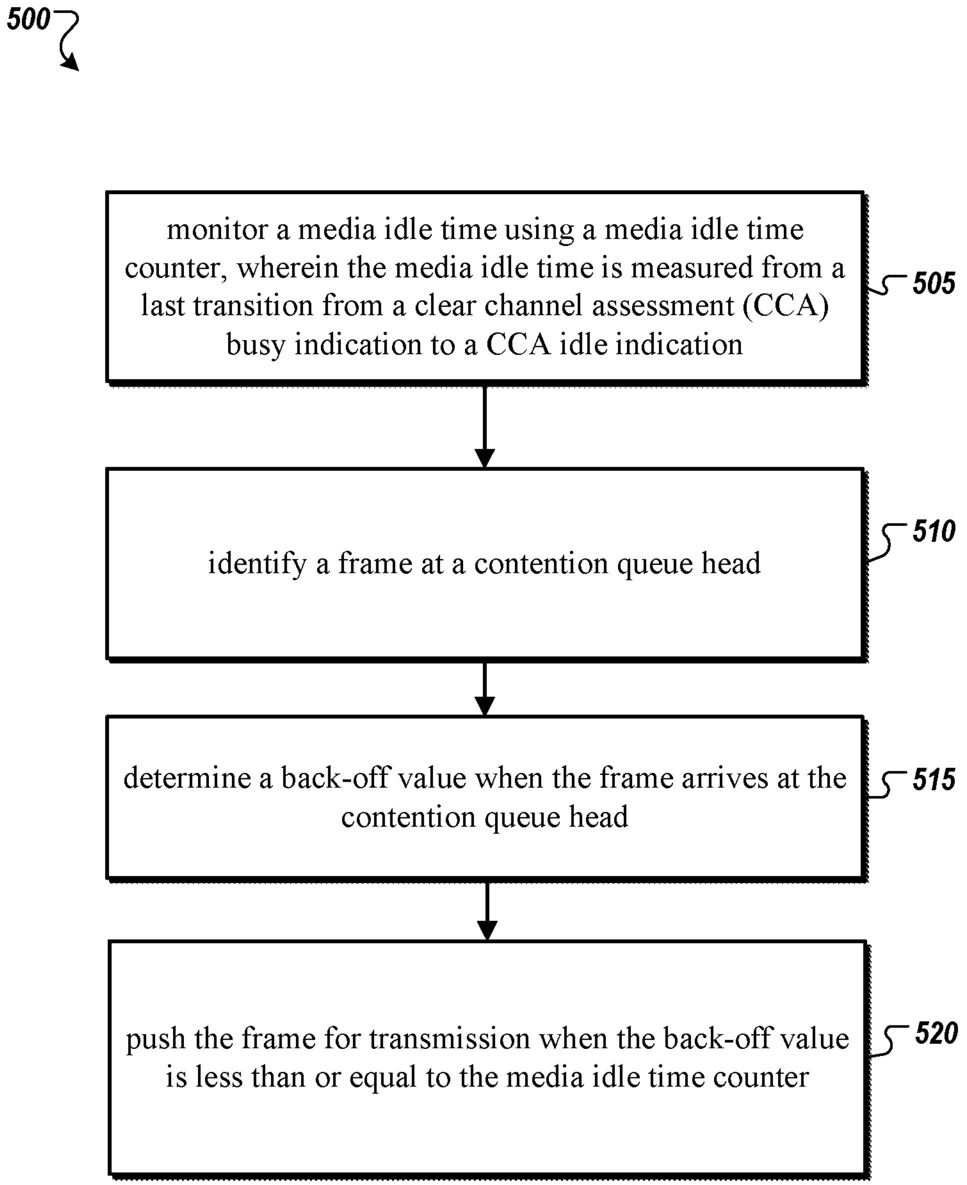
FIG. 5 illustrates an example process flow of a wireless access point for latency-based contention described according to at least one implementation of the present disclosure.

FIG. 5 illustrates a process flow of an example method 500 for latency-based contention, in accordance with at least one example described in the present disclosure. The method 500 may be arranged in accordance with at least one example described in the present disclosure.

Figure 8:
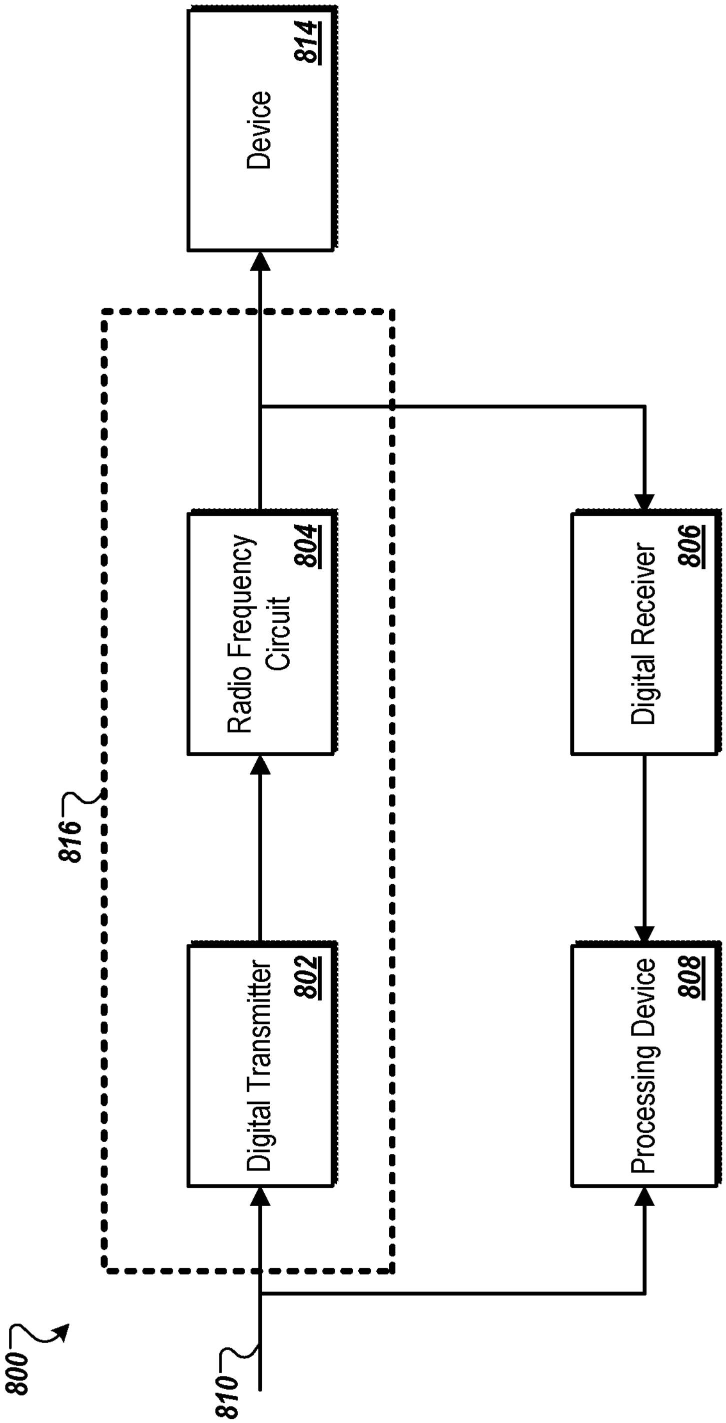
FIG. 8 illustrates an example communication system configured for access point interference reduction.
Figure 9:
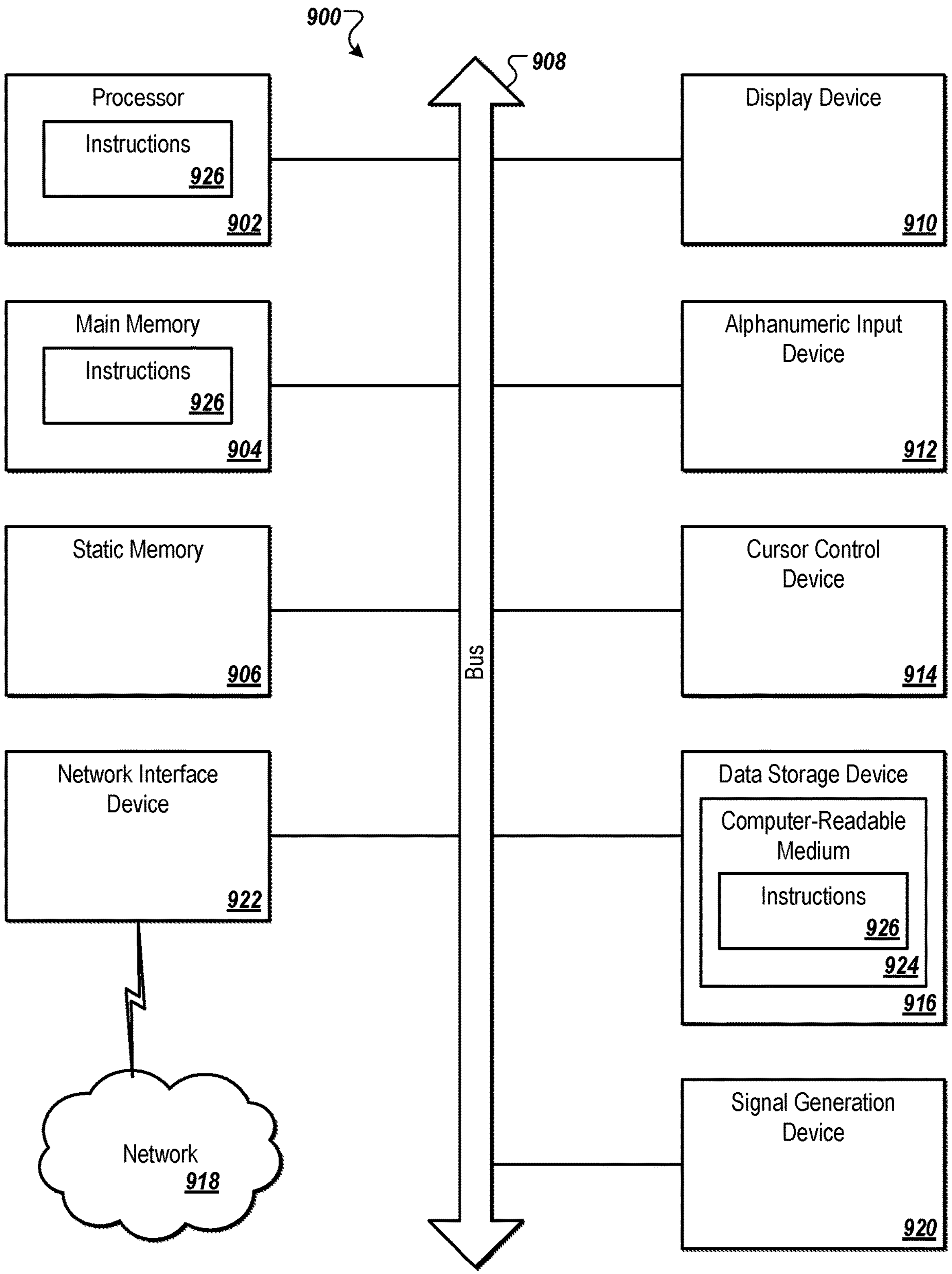
FIG. 9 illustrates a diagrammatic representation of a machine in the example form of a computing device within which a set of instructions, for causing the machine to perform any one or more of the methods discussed herein, may be executed.

The method 500 may be performed by processing logic that may include hardware (circuitry, dedicated logic, etc.), software (such as is run on a computer system or a dedicated machine), or a combination of both, which processing logic may be included in the processing device (e.g., processor 902) of FIG. 9, the communication system 800 of FIG. 8, or another device, combination of devices, or systems.

The method 500 may begin at block 505 wherein the processing logic may monitor a media idle time using a media idle time counter, wherein the media idle time is measured from a last transition from a CCA busy indication to a CCA idle indication.

At block 510, the processing logic may identify a frame at a contention queue head.

At block 515, the processing logic may determine a back-off counter when the frame arrives at the contention queue head.

At block 520, the processing logic may push the frame for transmission when the back-off counter is less than or equal to the media idle time counter.

Modifications, additions, or omissions may be made to the method 500 without departing from the scope of the present disclosure. For example, in some examples, the method 500 may include any number of other components that may not be explicitly illustrated or described.

Figure 6:
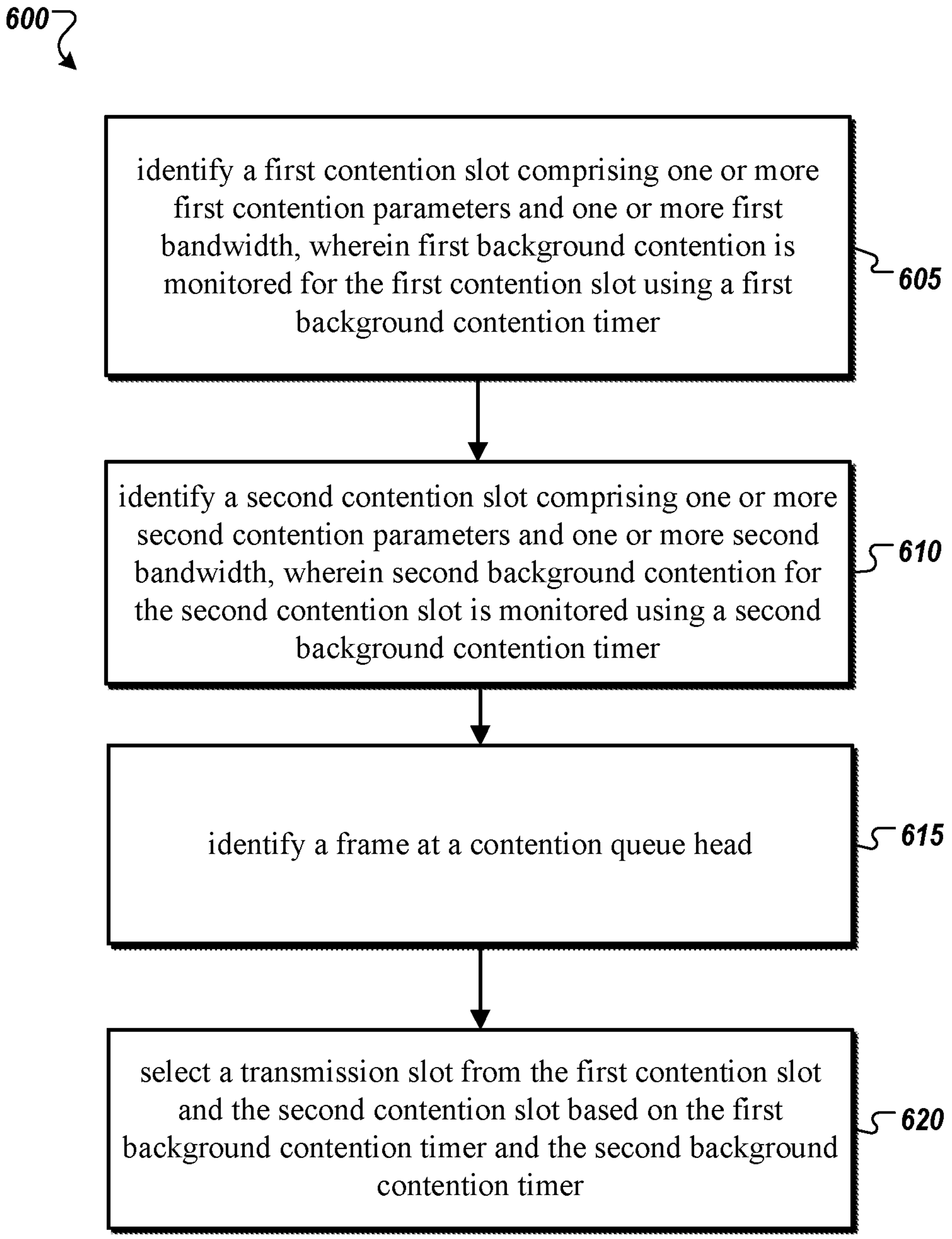
FIG. 6 illustrates an example process flow of wireless access point for latency-based contention described according to at least one implementation of the present disclosure.

FIG. 6 illustrates a process flow of an example method 600 that may be used for latency-based contention, in accordance with at least one example described in the present disclosure. The method 600 may be arranged in accordance with at least one example described in the present disclosure.

The method 600 may be performed by processing logic that may include hardware (circuitry, dedicated logic, etc.), software (such as is run on a computer system or a dedicated machine), or a combination of both, which processing logic may be included in the processing device (e.g., processor 902) of FIG. 9, the communication system 800 of FIG. 8, or another device, combination of devices, or systems.

The method 600 may begin at block 605 wherein the processing logic may identify a first contention slot comprising one or more first contention parameters and one or more first bandwidth, wherein first background contention is monitored for the first contention slot using a first background contention timer.

At block 610, the processing logic may identify a second contention slot comprising one or more second contention parameters and one or more second bandwidth, wherein second background contention for the second contention slot is monitored using a second background contention timer.

At block 615, the processing logic may identify a frame at a contention queue head.

At block 620, the processing logic may select a transmission slot from the first contention slot and the second contention slot based on the first background contention timer and the second background contention timer.

Modifications, additions, or omissions may be made to the method 600 without departing from the scope of the present disclosure. For example, in some examples, the method 600 may include any number of other components that may not be explicitly illustrated or described.

Figure 7:
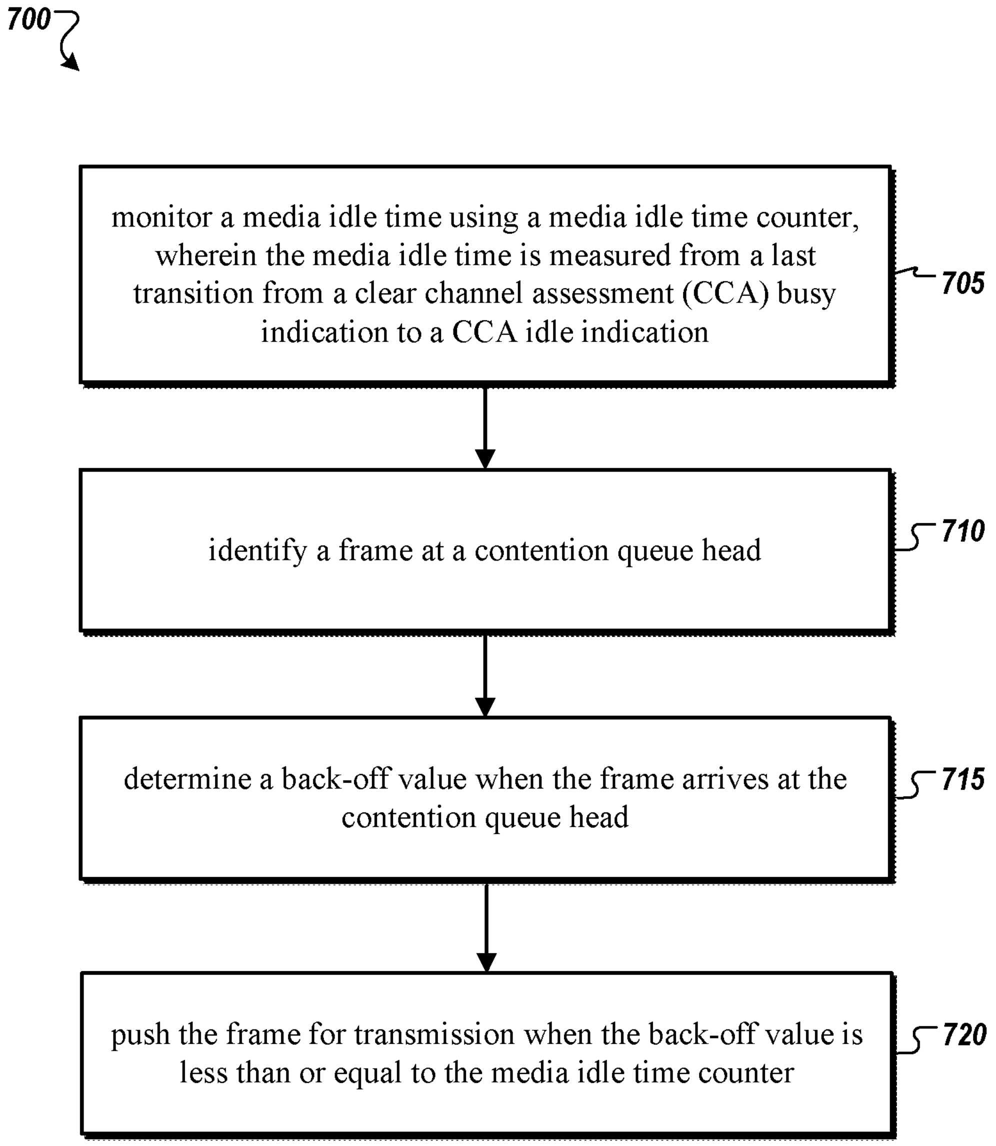
FIG. 7 illustrates an example process flow of a station (STA) for latency-based contention described according to at least one implementation of the present disclosure.

FIG. 7 illustrates a process flow of an example method 700 that may be used for latency-based contention, in accordance with at least one example described in the present disclosure. The method 700 may be arranged in accordance with at least one example described in the present disclosure.

The method 700 may be performed by processing logic that may include hardware (circuitry, dedicated logic, etc.), software (such as is run on a computer system or a dedicated machine), or a combination of both, which processing logic may be included in the processing device (e.g., processor 902) of FIG. 9, the communication system 800 of FIG. 8, or another device, combination of devices, or systems.

The method 700 may begin at block 705 wherein the processing logic may monitor a media idle time using a media idle time counter, wherein the media idle time is measured from a last transition from a CCA busy indication to a CCA idle indication.

At block 710, the processing logic may identify a frame at a contention queue head.

At block 715, the processing logic may determine a back-off counter when the frame arrives at the contention queue head.

AT block 720, the processing logic may push the frame for transmission when the back-off counter is less than or equal to the media idle time counter.

Modifications, additions, or omissions may be made to the method 700 without departing from the scope of the present disclosure. For example, in some examples, the method 700 may include any number of other components that may not be explicitly illustrated or described.

For simplicity of explanation, methods and/or process flows described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

FIG. 8 illustrates a block diagram of an example communication system 800 configured for latency-based contention, in accordance with at least one example described in the present disclosure. The communication system 800 may include a digital transmitter 802, a radio frequency circuit 804, a device 814, a digital receiver 806, and a processing device 808. The digital transmitter 802 and the processing device may be configured to receive a baseband signal via connection 810. A transceiver 816 may comprise the digital transmitter 802 and the radio frequency circuit 804.

In some examples, the communication system 800 may include a system of devices that may be configured to communicate with one another via a wired or wireline connection. For example, a wired connection in the communication system 800 may include one or more Ethernet cables, one or more fiber-optic cables, and/or other similar wired communication mediums. Alternatively, or additionally, the communication system 800 may include a system of devices that may be configured to communicate via one or more wireless connections. For example, the communication system 800 may include one or more devices configured to transmit and/or receive radio waves, microwaves, ultrasonic waves, optical waves, electromagnetic induction, and/or similar wireless communications. Alternatively, or additionally, the communication system 800 may include combinations of wireless and/or wired connections. In these and other examples, the communication system 800 may include one or more devices that may be configured to obtain a baseband signal, perform one or more operations to the baseband signal to generate a modified baseband signal, and transmit the modified baseband signal, such as to one or more loads.

In some examples, the communication system 800 may include one or more communication channels that may communicatively couple systems and/or devices included in the communication system 800. For example, the transceiver 816 may be communicatively coupled to the device 814.

In some examples, the transceiver 816 may be configured to obtain a baseband signal. For example, as described herein, the transceiver 816 may be configured to generate a baseband signal and/or receive a baseband signal from another device. In some examples, the transceiver 816 may be configured to transmit the baseband signal. For example, upon obtaining the baseband signal, the transceiver 816 may be configured to transmit the baseband signal to a separate device, such as the device 814. Alternatively, or additionally, the transceiver 816 may be configured to modify, condition, and/or transform the baseband signal in advance of transmitting the baseband signal. For example, the transceiver 816 may include a quadrature up-converter and/or a digital to analog converter (DAC) that may be configured to modify the baseband signal. Alternatively, or additionally, the transceiver 816 may include a direct RF sampling converter that may be configured to modify the baseband signal.

In some examples, the digital transmitter 802 may be configured to obtain a baseband signal via connection 810. In some examples, the digital transmitter 802 may be configured to up-convert the baseband signal. For example, the digital transmitter 802 may include a quadrature up-converter to apply to the baseband signal. In some examples, the digital transmitter 802 may include an integrated digital to analog converter (DAC). The DAC may convert the baseband signal to an analog signal, or a continuous time signal. In some examples, the DAC architecture may include a direct RF sampling DAC. In some examples, the DAC may be a separate element from the digital transmitter 802.

In some examples, the transceiver 816 may include one or more subcomponents that may be used in preparing the baseband signal and/or transmitting the baseband signal. For example, the transceiver 816 may include an RF front end (e.g., in a wireless environment) which may include a power amplifier (PA), a digital transmitter (e.g., 802), a digital front end, an institute of electrical and electronics engineers (IEEE) 1588v2 device, a Long-Term Evolution (LTE) physical layer (L-PHY), an (S-plane) device, a management plane (M-plane) device, an Ethernet media access control (MAC)/personal communications service (PCS), a resource controller/scheduler, and the like. In some examples, a radio (e.g., a radio frequency circuit 804) of the transceiver 816 may be synchronized with the resource controller via the S-plane device, which may contribute to high-accuracy timing with respect to a reference clock.

In some examples, the transceiver 816 may be configured to obtain the baseband signal for transmission. For example, the transceiver 816 may receive the baseband signal from a separate device, such as a signal generator. For example, the baseband signal may come from a transducer configured to convert a variable into an electrical signal, such as an audio signal output of a microphone picking up a speaker's voice. Alternatively, or additionally, the transceiver 816 may be configured to generate a baseband signal for transmission. In these and other examples, the transceiver 816 may be configured to transmit the baseband signal to another device, such as the device 814.

In some examples, the device 814 may be configured to receive a transmission from the transceiver 816. For example, the transceiver 816 may be configured to transmit a baseband signal to the device 814.

In some examples, the radio frequency circuit 804 may be configured to transmit the digital signal received from the digital transmitter 802. In some examples, the radio frequency circuit 804 may be configured to transmit the digital signal to the device 814 and/or the digital receiver 806. In some examples, the digital receiver 806 may be configured to receive a digital signal from the RF circuit and/or send a digital signal to the processing device 808.

In some examples, the processing device 808 may be a standalone device or system, as illustrated. Alternatively, or additionally, the processing device 808 may be a component of another device and/or system. For example, in some examples, the processing device 808 may be included in the transceiver 816. In instances in which the processing device 808 is a standalone device or system, the processing device 808 may be configured to communicate with additional devices and/or systems remote from the processing device 808, such as the transceiver 816 and/or the device 814. For example, the processing device 808 may be configured to send and/or receive transmissions from the transceiver 816 and/or the device 814. In some examples, the processing device 808 may be combined with other elements of the communication system 800.

Some portions of the detailed description are presented in terms of algorithms and symbolic representations of operations within a computer. An algorithm may be a series of configured operations leading to a desired end state or result. In example implementations, the operations carried out may use physical manipulations of tangible quantities for achieving a tangible result.

Description using terms such as detecting, determining, analyzing, identifying, scanning or the like, may include the actions and processes of a computer system or other information processing device that may manipulate and/or transform data represented as physical (electronic) quantities within the computer system's registers and memories into other data similarly represented as physical quantities within the computer system's memories or registers or other information storage, transmission, or display devices.

Example implementations may also relate to an apparatus for performing the operations herein. This apparatus may be specially constructed for the operations provided herein, or it may include one or more general-purpose computers selectively activated or reconfigured by one or more computer programs. Such computer programs may be stored in a computer readable medium, such as a computer-readable storage medium or a computer-readable signal medium. Computer-executable instructions may include, for example, instructions and data which cause a general-purpose computer, special-purpose computer, or special-purpose processing device (e.g., one or more processors) to perform or control performance of a certain function or group of functions.

An example apparatus may include a Wireless Access Point (WAP) and/or a station (STA), which may use a VLSI processor and/or program code. An example transceiver may couple via an integral modem to one or more of a cable, fiber, or digital subscriber backbone connection to the Internet to support wireless communications, e.g. IEEE 802.11 compliant communications, on a Wireless Local Area Network (WLAN). The WiFi® stage may include one or more of a baseband stage, an analog front end (AFE) stage, or a Radio Frequency (RF) stage. In the baseband portion, wireless communications may be transmitted to and/or received from each user/client/station to be processed. The AFE and RF portion may be configured to up-convert signals directed to one or more transmit paths of wireless transmissions (e.g., as initiated in the baseband). The RF portion may be configured to down-convert the signals received on the receive paths and pass them for further processing to the baseband.

An example apparatus may be a multiple-input multiple-output (MIMO) apparatus which may support as many as N×N discrete communication streams over N antennas. The signal processing units of the MIMO apparatus may be implemented as N×N. The value of N may be 4, 6, 8, 12, 16, or so forth. Extended MIMO operation may facilitate the use of up to 2N antennae in communication with a different wireless system. Extended MIMO systems may be configured to communicate with other wireless systems when the systems do not have the same number of antennae (e.g., some of the antennae of one of the stations may not be used).

Channel State Information (CSI) may be extracted independently of changes related to channel state parameters and may be used for spatial diagnosis services of the network such as motion detection, proximity detection, and/or localization which may be used in, for example, WLAN diagnosis, home security, health care monitoring, smart home utility control, elder care, automotive tracking and monitoring, home or mobile entertainment, automotive infotainment, or the like.

FIG. 9 illustrates a diagrammatic representation of a machine in the example form of a computing device 900 within which a set of instructions, for causing the machine to perform any one or more of the methods discussed herein, may be executed. The computing system may be configured to implement or direct one or more operations associated with latency-based contention. The computing device 900 may include a rackmount server, a router computer, a server computer, a mainframe computer, a laptop computer, a tablet computer, a desktop computer, or any computing device with at least one processor, etc., within which a set of instructions, for causing the machine to perform any one or more of the methods discussed herein, may be executed. In alternative examples, the machine may be connected (e.g., networked) to other machines in a local area network (LAN), an intranet, an extranet, or the Internet. The machine may operate in the capacity of a server machine in client-server network environment. Further, while only a single machine is illustrated, the term "machine" may also include any collection of machines that individually or jointly execute a set (or multiple sets) of instructions to perform any one or more of the methods discussed herein.

The example computing device 900 includes a processing device (e.g., a processor 902), a main memory 904 (e.g., read-only memory (ROM), flash memory, dynamic random access memory (DRAM) such as synchronous DRAM (SDRAM)), a static memory 906 (e.g., flash memory, static random access memory (SRAM)) and a data storage device 916, which communicate via a bus 908.

Processing device (e.g., processor 902) represents one or more general-purpose processing devices such as a microprocessor, central processing unit, or the like. More particularly, the processing device (e.g., processor 902) may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device (processor 902) may also include one or more special-purpose processing devices such as an application specific integrated circuit (ASIC), a field programmable gate array (FPGA), a digital signal processor (DSP), network processor, or the like. The processing device (e.g., processor 902) is configured to execute instructions 926 for performing the operations and steps discussed herein.

The computing device 900 may further include a network interface device 922 which may communicate with a network 918. The computing device 900 also may include a display device 910 (e.g., a liquid crystal display (LCD) or a cathode ray tube (CRT)), an alphanumeric input device 912 (e.g., a keyboard), a cursor control device 914 (e.g., a mouse) and a signal generation device 920 (e.g., a speaker). In at least one example, the display device 910, the alphanumeric input device 912, and the cursor control device 914 may be combined into a single component or device (e.g., an LCD touch screen).

The data storage device 916 may include a computer-readable storage medium 924 on which is stored one or more sets of instructions 926 embodying any one or more of the methods or functions described herein. The instructions 926 may also reside, completely or at least partially, within the main memory 904 and/or within the processing device (e.g., processor 902) during execution thereof by the computing device 900, the main memory 904 and the processing device (e.g., processor 902) also constituting computer-readable media. The instructions may further be transmitted or received over a network 918 via the network interface device 922.

While the computer-readable storage medium 924 is shown in an example to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media.

In some examples, the different components, modules, engines, and services described herein may be implemented as objects or processes that execute on a computing system (e.g., as separate threads). While some of the systems and methods described herein are generally described as being implemented in software (stored on and/or executed by hardware), specific hardware implementations or a combination of software and specific hardware implementations are also possible and contemplated.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the disclosure and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A wireless access point for latency-based contention, comprising:

a processing device configured to:

monitor a media idle time using a media idle time counter, wherein the media idle time is measured from a last transition from a clear channel assessment (CCA) busy indication to a CCA idle indication;

identify a frame at a contention queue head;

determine a back-off counter when the frame arrives at the contention queue head; and push the frame for transmission when the back-off counter is less than or equal to the media idle time counter, wherein the media idle time counter accounts for media idle time accumulated prior to the frame arriving at the contention queue head; and a transceiver configured to transmit the frame.

2. The wireless access point of claim 1, wherein the processing device is further configured to:

determine the back-off counter based on one or more of arbitration inter-frame spacing (AIFS) or a random back-off counter between zero and a contention window (CW).

3. The wireless access point of claim 1, wherein the processing device is further configured to:

set the media idle time counter to zero when the CCA idle indication transitions to a CCA busy indication; and freeze the media idle time counter at zero until the CCA busy indication transitions to the CCA idle indication.

4. The wireless access point of claim 1, wherein the processing device is further configured to:

monitor the media idle time based on one or more of a link, a frequency range, a bandwidth, a frequency band, a frequency sub-band, a frequency channel, or a contiguous CCA frequency portion.

5. The wireless access point of claim 1, wherein the processing device is further configured to:

monitor the media idle time based on puncturing for a dynamic sub-band CCA indication.

6. The wireless access point of claim 1, wherein the processing device is further configured to:

select a transmission mode from a plurality of transmission modes based on one or more transmission mode idle times for the plurality of transmission modes.

7. The wireless access point of claim 1, wherein the processing device is further configured to:

select a physical layer protocol data unit (PPDU) bandwidth (BW) mode based on one or more of a CCA indication, a link indication, a number of users, a physical layer (PHY) mode, permitted BW channels, or permitted BW sub-channels; or select a puncturing mode based on one or more of the CCA indication, the link indication, the number of users, the PHY mode, the permitted BW channels, or the permitted BW sub-channels.

8. The wireless access point of claim 1, wherein the processing device is further configured to:

select a transmission slot from a plurality of contention slots based on background contention for the plurality of contention slots; and push the frame for transmission using the transmission slot.

9. A station (STA) for latency-based contention, comprising:

a processing device configured to:

monitor a media idle time using a media idle time counter, wherein the media idle time is measured from a last transition from a clear channel assessment (CCA) busy indication to a CCA idle indication;

identify a frame at a contention queue head;

determine a back-off counter when the frame arrives at the contention queue head; and push the frame for transmission when the back-off counter is less than or equal to the media idle time counter, wherein the media idle time counter includes media idle time accumulated prior to the frame arriving at the contention queue head; and a transceiver configured to transmit the frame.

10. The station of claim 9, wherein the processing device is further configured to:

determine the back-off counter based on one or more of arbitration inter-frame spacing (AIFS) or a random back-off counter between zero and a contention window (CW).

11. The station of claim 9, wherein the processing device is further configured to:

set the media idle time counter to zero when the CCA idle indication transitions to a CCA busy indication; and freeze the media idle time counter at zero until the CCA busy indication transitions to the CCA idle indication.

12. The station of claim 9, wherein the processing device is further configured to:

monitor the media idle time based on one or more of a link, a frequency range, a bandwidth, a frequency band, a frequency sub-band, a frequency channel, or a contiguous CCA frequency portion.

13. The station of claim 9, wherein the processing device is further configured to:

monitor the media idle time based on puncturing for a dynamic sub-band CCA indication.

14. The station of claim 9, wherein the processing device is further configured to:

select a transmission mode from a plurality of transmission modes based on one or more transmission mode idle times for the plurality of transmission modes.

15. The station of claim 9, wherein the processing device is further configured to:

select a physical layer protocol data unit (PPDU) bandwidth (BW) mode based on one or more of a CCA indication, a link indication, a number of users, a physical layer (PHY) mode, permitted BW channels, or permitted BW sub-channels; or select a puncturing mode based on one or more of the CCA indication, the link indication, the number of users, the PHY mode, the permitted BW channels, or the permitted BW sub-channels.

16. The station of claim 9, wherein the processing device is further configured to:

select a transmission slot from a plurality of contention slots based on background contention for the plurality of contention slots; and push the frame for transmission using the transmission slot.

* * * * *